United States Patent Office 3,323,446
Patented June 6, 1967

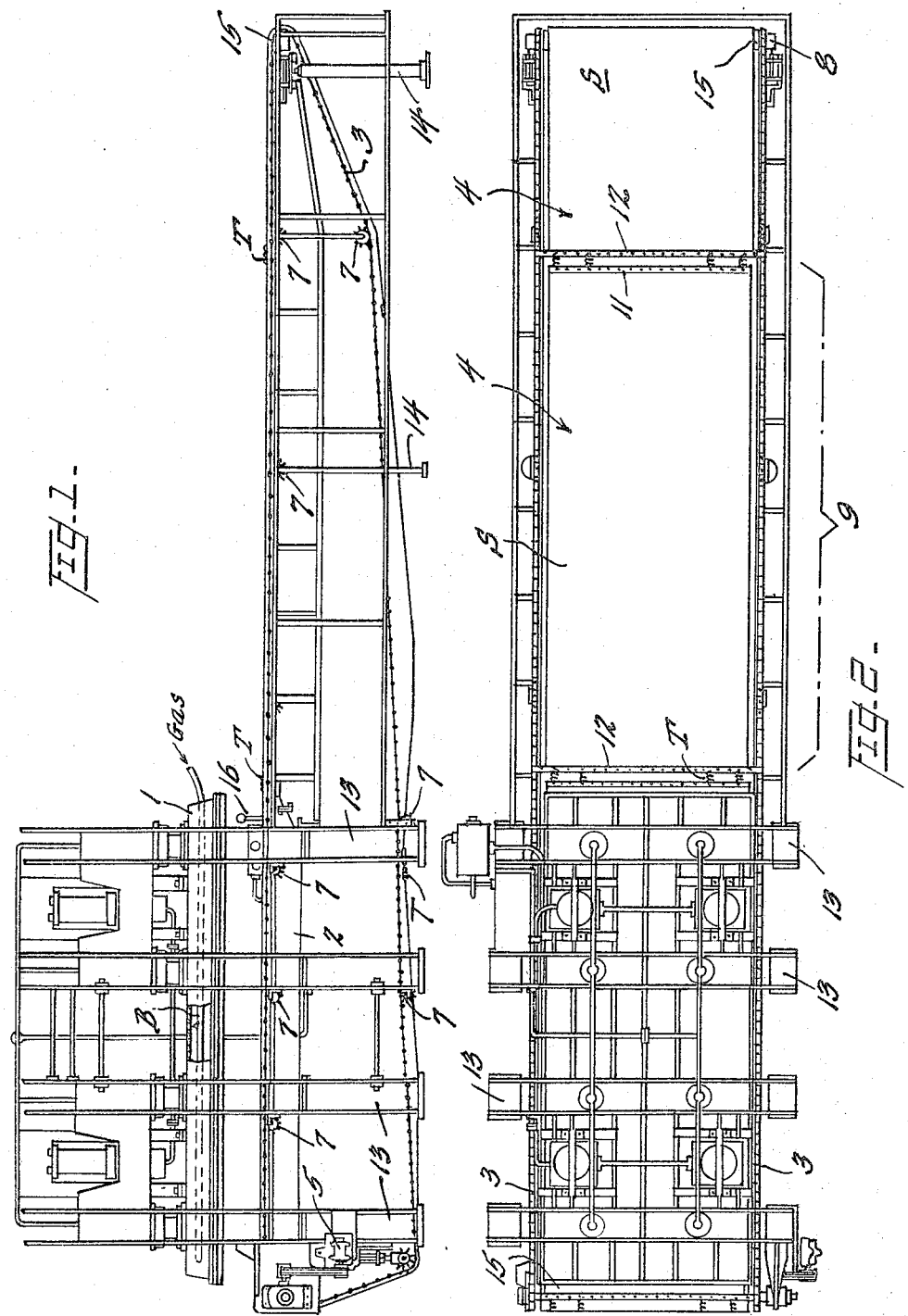

3,323,446
ENDLESS BELT CONVEYOR FOR INTERMITTENT
FEEDING OF HEATED PRESS
Walter Alpini, Via Castelfidardo 52,
Civitanova Marche, Italy
Filed Aug. 2, 1965, Ser. No. 476,567
Claims priority, application Italy, Aug. 2, 1964,
17,215/64
2 Claims. (Cl. 100—93)

The present invention relates to presses and, more particularly, to a continuous cycle press having an improved conveying system for feeding the work through the press.

Presses for manufacturing and working on products with a combination of pressure and heat frequently carry single belt conveyor systems which require considerable manpower to properly arrange the work at the loading station. In the prior art arrangements of which I am aware, the speed of the conveyor system has been limited by the need to allow the parts of the conveyor to move slowly to allow them to cool after being subjected to the work operation which, of course, results in an inefficient use of the manpower at the loading station. In some cases this slow processing even results in the danger of deterioration of the product and the various chemicals employed.

Thus, the object of this invention is to provide a continuous feeding cycle press having in the preferred embodiment, an endless conveyor comprising a plurality of resiliently connected sheets upon which the work may be placed for intermittent feeding movement through the press, which in turn, comprises two superimposed plates, of which the upper 1 is movable, while the lower 2 is fixed, said plates being exposed to heating for the purpose of manufacturing various articles produced under compression.

The invention is illustrated herein by way of a non-limiting example as per the appended drawings wherein:

FIG. 1 represents schematically a side view of the apparatus comprising the continuous duty press;

FIG. 2 represents the same press, as viewed from the above.

Referring now to the drawings, the invention relates to a continuous duty press, including a rotary belt, generally indicated by the reference numeral 4, which comprises a plurality of plates or sheets S of a suitable material, preferably a metal, said rotary belt being of the joined sheet type and being supported and operated by suitable transmission means preferably in the form of drive chains 3. As shown, the forward movement of the belt 4 is such as to move from the loading station indicated at 9, into supported relationship on a stationary lower plate 2, which thus constitutes a support for the articles to be pressed by a reciprocable upper plate 1. The upper plate 1 may be provided with a conventional gas or other type of burner B extending along its length to supply the necessary heat for the pressing operation. One of the chains 3 is situated at each side of the belt 4, said transmission elements being controlled by a power source 5 and being situated outside of the lower plate 2 in order to prevent being exposed to the heat of the press and thus to avoid expansion due to the heat.

The drive chains carry idler adjustment gears 7 along the length of the conveyor, which gears 7 are provided with ball bearings 8, the purpose of said last named gears being to provide better operation, considering that the drive chains 3 carry the belt 4 as illustrated in FIG. 2.

One important feature of this invention resides in the fact that the belt 4 is divided into the sheets S, which are spaced from each other to allow relative expansion and contraction; the number being suitably selected according to manufacturing and production requirements of the press. The plates S also operate as a movable bench to permit preparation of the material at the loading station 9 prior to being subjected to the action of the press.

The rotary belt 4 can be of a very thin flexible metal and is connected to the transmission chains 3 by small transverse rods 12, each being capable of supporting one end of the sheets S while floating transverse rods 11 support the other ends which are, in turn, connected to the rods 12 by tension springs T (see FIG. 2) that operate to maintain the associated rotating sheets S in a taut condition and allow expansion or contraction in all directions.

As illustrated in FIG. 1, the main supports 13 act as a base for the press itself, while supports 14 perform the function of supporting the loading portion of the apparatus and the transmission elements 3 which are to drive the rotary belt 4.

Another feature of the invention resides in the provision, at both the ends of the press, of rolls 15 which define the operative flight of the belt 4. It will be clear that the joined sheet rotary belt 4 slides over the rolls 15 in a controlled manner thus maintaining the tautness in the operative flight where the work is supported.

The operation of the press is as follows:

Considering that the joined sheet rotary belt 4 must slide upon the normally fixed plate 2 as it is driven by transmission chains 3 controlled by a power source 5, and that both plates 1 and 2 are to be exposed to heating before receiving the panels, boards or other work products to be compressed, the operator of the press prepares the articles on a portion of belt 4 termed a setting bench or loading station and indicated at 9, upon which the material is brought to optimum working condition. No operation is required between this preparation of the material itself and the press feeding step, since in the case of hot-working, the material would be subjected to the setting step on a sufficiently cooled plate.

When the operators have prepared the load at the loading station 9, the power source 5 is started thus driving the rotary belt 4 through the side transmission elements 3, carrying the work into the press, while a new sheet S of the belt reaches the preparation or loading position and becomes in effect, a new loading bench 9. At this point, a suitable hydraulic system (not shown) is actuated by operation of lever 16 thereby lowering the movable plate 1 and compressing the material being processed on the fixed plate 2. When the pressing phase is complete and the belt 4 has resumed its timed rotary motion, programmed according to requirements, the processed article is ejected from the belt by dropping or by guide means.

The advantages stemming from the practice of the invention have been pointed out, and are as follows:

The side drive chains 3, which are each capable of independent adjustment, are not exposed to direct heat and, therefore, are not affected by expansion. Consequently, any adjustment required by such expansion is eliminated, and furthermore, it is possible advantageously to use a thinner or lighter material for the construction of the sheets 3 of the rotary belt 4, as a consequence of provision of the independent drive chains. This is so since no driving tension is transmitted through the transverse rods 12 to the sheets S and, indeed, the sheets S are kept under controlled tautness or tension by the floating rod 11 and the springs T.

Thus, the division of the belt 4 in a desirable number of sheets S, avoids thermal expansion problems thus making it possible to rapidly prepare the material on the sheets S in succession without observing any cool down period thus speeding up the overall pressing operation.

The invention has been described and illustrated only by way of a non-limiting example. It is obvious that the invention can be subjected to many modifications which will be suggested by the art and by its practice but remaining within the scope of the invention itself.

What I claim is:

1. In a heated reciprocating press, the combination comprising a lower stationary plate and an upper, movable, compression plate, an endless belt conveyor for intermittent feeding of the work to said press, said belt conveyor comprising a continuous transmission member along each side of said stationary plate, a plurality of transverse support rods extending between said members, a plurality of individual work supporting sheets for movement over said stationary plate to present the work for the pressing operation, each of said sheets being connected at one of its ends to a respective one of said support rods, a floating rod connected to the other end of each of said sheets, resilient means interconnecting each of said floating rods to the next in-line support rod for maintaining each respective sheet in a tensioned condition whereby said sheets are free to expand and contract in all directions from changes in heat as they are drawn over said stationary plate of said heated press.

2. The combination of claim 1 wherein is further provided a plurality of rotative idler guide means mounted along each side of the operative run of said conveyor belt for supporting said transmission members, and a transversely extending roller at each end of said operative run to controllably guide each of said sheets along the endless path.

References Cited

UNITED STATES PATENTS

| | | | |
|---|---|---|---|
| 1,949,917 | 3/1934 | Muench | 100—215 |
| 2,642,782 | 6/1953 | Chapman | 100—222 X |
| 3,173,976 | 3/1965 | Paerels et al. | |
| 3,226,764 | 1/1966 | Hostettler | 100—215 X |
| 3,232,219 | 2/1966 | Gunkel | 100—222 X |

FOREIGN PATENTS

| | | |
|---|---|---|
| 1,200,866 | 7/1959 | France. |

BILLY J. WILHITE, *Primary Examiner.*